United States Patent Office 3,495,017
Patented Feb. 10, 1970

3,495,017
FLUOROALCOHOL BACTERICIDES
Arleen C. Pierce, Monmouth Junction, N.J., assignor to Allied Chemical Corporation, New York, N.Y., a corporation of New York
No Drawing. Filed Sept. 15, 1967, Ser. No. 668,171
Int. Cl. A61k *27/00;* C07c *33/10*
U.S. Cl. 424—343                                4 Claims

ABSTRACT OF THE DISCLOSURE

This specification discloses a method of combating micro-organisms, particularly *Staphylococcus aureus* cells, by treating them with an effective amount of an ethylenically unsaturated fluorine-containing aliphatic alcohol in vapor phase.

---

The usual methods of sterilization, such as use of steam, heat, chemical solution, radiation, and the like, are often impractical when large areas such as hospital rooms, laboratories, and animal quarters are to be sterilized. This may be true also when sterilization of articles which may be adversely affected by moisture or heat, such as delicate laboratory and medical equipment, or fabrics, plastics, and the like, are required. Sterilization problems of this kind can frequently be overcome by using chemical antimicrobial agents which are effective in vapor phase to produce sterilization. Effective vapor phase chemical antimicrobial agents must be capable of being readily introduced into the area to be treated; of rapidly and thoroughly penetrating all porous surfaces in the area; of effectively penetrating the micro-organisms to be treated and of controlling them, i.e. by destroying them or by inhibiting their propagation, at normal temperatures and relative humidities; and of being readily removed by aeration. Chemical compositions which can meet these stringent requirements are relatively few and thus the use of vapor phase antimicrobial agents has had but limited use up to the present time.

According to the method of the present invention, microorganisms can be controlled by treating them with an effective amount of an unsaturated fluoroalcohol having the structural formula:

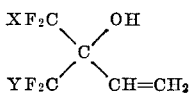

wherein X and Y are the same or different and represent hydrogen, fluorine and chlorine in vapor phase.

Examples of suitable unsaturated fluoroalcohols encompassed within this general formula are:

1,1,1-trifluoro-2-trifluoromethyl-3-buten-2-ol,
1,1,1-chlorofluoro-2-trifluoromethyl-3-buten-2-ol,
1,1,1-chlorodifluoro-2-chlorodifluoromethyl-3-buten-2-ol,
1,1,1-trifluoro-2-difluoromethyl-3-buten-2-ol,
1,1,1-chlorodifluoro-2-difluoromethyl-3-buten-2-ol,
1,1-difluoro-2-difluoromethyl-3-buten-2-ol, and the like and isomers thereof.

The unsaturated fluoroalcohols used in the invention and hereinafter referred to as the subject fluoroalcohols, can be prepared by reacting an appropriate fluoroacetone with a vinyl organometallic compound, such as vinyl magnesium chloride, vinyl magnesium bromide and vinyl lithium, in a solvent such as tetrahydrofuran, followed by acid hydrolysis. This process can be illustrated further by the equations set forth below:

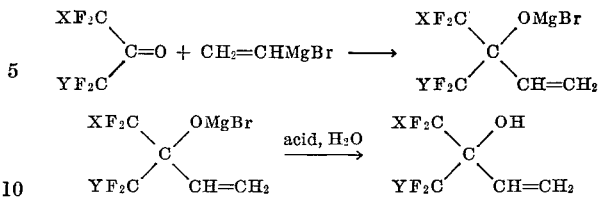

wherein X and Y have the meanings given above. These composition and methods for preparing them have been disclosed in greater detail in a copending U.S. application of Dear and Gilbert, Ser. No. 550,113, filed May 16, 1966.

In accordance with the invention, the subject fluoroalcohols can be introduced into the area to be sterilized in liquid form and allowed to penetrate the area by evaporation. Alternatively, they can be admixed with a diluent inert gas or mixture of gases. As an example, air can be bubbled through the liquid subject fluoroalcohols and the fluoroalcohol-laden air passed into the area to be treated. The subject fluoroalcohol can also be admixed with a suitable propellent mixture and sprayed into the area. The subject fluoroalcohols, individually or mixtures of any of them, can be employed as the active ingredient in combating microorganisms, or if desired, one or more can be used with other known vapor phase antimicrobial agents such as ethylene oxide. In addition to a vapor diluent, the subject fluoroalcohols can be used with other vaporizable components such as perfumes, deodorants, water vapor and the like.

As is known in the prior art, the dosages of a chemical antimicrobial agent required to effect control can vary widely depending upon the particular microorganisms to be controlled, the size of the area to be treated, the time within which it is desired to effect control and environmental conditions such as temperature, relative humidity, etc. Generally, as with other vapor phase antimicrobial agents, the effectiveness of the subject fluoroalcohols increases with an increase in relative humidity. In the preferred method of practicing the invention, water vapor is present in the area to be sterilized in an amount equivalent to at least about 90% relative humidity when the subject fluoroalcohol vapor is introduced. A sufficient amount of the subject fluoroalcohol is employed so as to provide the desired toxicity. The dosages that will be required to sterilize a particular area to ensure control of microorganisms can be readily ascertained, as will be known to one skilled in the art.

The following examples will serve to further illustrate the invention, but it is to be understood that the invention is not to be limited to the details described therein. In the examples, all parts and percentages are by weight unless otherwise noted.

EXAMPLE 1

Preparation of 1,1,1-trifluoro-2-trifluoromethyl-3-buten-2-ol 62.5 parts of vinyl magnesium chloride prepared according to the procedure given by H. E. Ramsden et al., J. Org. Chem., 22, 1602 (1957) in 200 ml. of tetrahydrofuran was charged to a vessel fitted with a stirrer, gas inlet tube, nitrogen purge, thermometer and Dry-Ice/methylene chloride condenser. The vessel was cooled to about —5° C. and 116 parts of hexafluoroacetone were added over a two-hour period. Stirring was continued overnight at room temperature. The mixture was then cooled to —5° C. and 270 parts of a 10% hydrochloric acid aqueous solution were stirred in. The layers which formed were separated and the organic layer recovered. After evaporation of the excess solvent, the remaining tetrahydrofuran/alcohol azeotropic mixture was added to concentrated sulfuric acid heated to a temperature of 100–110° C. The desired carbinol distilled off and was collected.

A 40.8% yield of 1,1,1-trifluoro-2-trifluoromethyl-3-buten-2-ol was obtained. The purified product had a boiling point of 72.5–73.5° C. and a refractive index $n_D^{25° C.}$ 1.3100. Elemental analysis calculated for $C_5H_4F_6O$: C, 30.94; H, 2.08. Found: C, 30.69; H, 2.09.

EXAMPLE 2

One-tenth ml. portions of 1,1,1-trifluoro - 2 - trifluoromethyl-3-buten-2-ol, as prepared above, were charged to one-liter flasks containing air having a predetermined relative humidity. Circular patches of cotton cloth, each having an area of about 2 cm.$^2$ and impregnated with an aqueous suspension of about $5\times10^6$ *Staphylococcus aureus* cells and subsequently dried, were suspended by wires about halfway down into the flasks. The flasks were stoppered and the contaminated patches were exposed to the fluoroalcohol vapor for periods of 1, 4 and 24 hours. At the end of the exposure periods, the patches were removed and assayed for viable organisms by the pour-plate method as follows: the patches were placed in dilution blanks composed of aqueous solutions of 0.1% by volume of lecithin and 0.71% of a suitable emulsifier which in this case was a polyoxyethylene derivative of fatty acid partial esters of hexitol anhydrides available as Tween 80 from Atlas Powder Company and the solution was adjusted to pH 7.0 with 1 N sodium hydroxide. Organisms remaining on the patch were dislodged by shaking and aliquots were plated in enriched nutrient agar. After incubating for 48 hours at 37° C., the percentage of organisms killed by the test fluoroalcohol was calculated by comparison of the number found after exposure with an assay of unexposed contaminated patches. Bacteria counts were made with a Quebec Colony counter. After one hour's exposure to 1,1,1-trifluoro-2-trifluoromethyl-3-buten-2-ol vapor at 72% relative humidity, over 99.9% of the *Staphylococcus aureus* cells were killed. At 90% relative humidity, 100% of the cells were killed after one hour's exposure to the test fluoroalcohol.

EXAMPLES 3–4

The procedure as in Example 2 is repeated using 1,1,1-chlorodifluoro-2-trifluoromethyl-3-buten - 2 - ol and 1,1,1-trifluoro-2-difluoromethyl-3-buten-2-ol prepared according to the procedure set forth in Example 1 but substituting chloropentafluoroacetone and pentafluoroacetone respectively for hexafluoroacetone. A comparable bactericidal effect is noted.

It will be apparent that many modifications and variations may be effected without departing from the scope of the novel concepts of the present invention, and the illustrative details disclosed are not to be construed as imposing limitations on the invention.

I claim:

1. A method for combating bacteria which comprises treating said bacteria with an effective amount of an unsaturated fluoroalcohol having the formula:

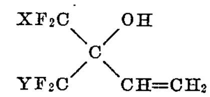

wherein X and Y can be the same or different and are selected from the group consisting of hydrogen, fluorine and chlorine, in vapor phase.

2. A method according to claim 1 wherein said fluoroalcohol is employed in the presence of water vapor.

3. A method according to claim 2 wherein said fluoroalcohol is 1,1,1-trifluoro-2-trifluoromethyl-3-buten-2-ol.

4. A method according to claim 2 wherein said microorganisms are *Staphylococcus aureus* cells.

References Cited

UNITED STATES PATENTS

| | | | |
|---|---|---|---|
| 3,164,610 | 1/1965 | Davis | 260—333 |
| 3,362,985 | 1/1968 | Gilbert et al. | 260—482 |

ALBERT T. MEYERS, Primary Examiner

HOWARD M. ELLIS, Assistant Examiner

U.S. Cl. X.R.

260—633